(12) United States Patent
Venkatesan et al.

(10) Patent No.: US 8,107,723 B2
(45) Date of Patent: Jan. 31, 2012

(54) MEASUREMENT OF THREE-DIMENSIONAL MOTION CHARACTERISTICS

(75) Inventors: Varun Akur Venkatesan, Bangalore (IN); Venkatesh Bagaria, Bangalore (IN)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 13/081,619

(22) Filed: Apr. 7, 2011

(65) Prior Publication Data
US 2011/0249864 A1   Oct. 13, 2011

(30) Foreign Application Priority Data
Apr. 9, 2010   (EP) .................................. 10003832

(51) Int. Cl.
*G06K 9/00*   (2006.01)
(52) U.S. Cl. ........................................ 382/154; 382/103
(58) Field of Classification Search .................. 382/103, 382/107, 154, 236; 345/419–420
See application file for complete search history.

(56) References Cited

U.S. PATENT DOCUMENTS

| 6,209,396 | B1 | 4/2001 | Schuessler |
| 6,664,531 | B2 * | 12/2003 | Gartner et al. ............. 250/208.1 |
| 7,092,105 | B2 * | 8/2006 | Lim et al. ...................... 356/601 |
| 7,961,912 | B2 * | 6/2011 | Stevick et al. ................ 382/106 |
| 2008/0199068 | A1 | 8/2008 | Case | |

FOREIGN PATENT DOCUMENTS

| DE | 10063293 A1 | 7/2002 |
| WO | WO 2009018849 A1 | 2/2009 |
| WO | WO 2009083655 A1 | 7/2009 |

* cited by examiner

*Primary Examiner* — Daniel Mariam

(57) ABSTRACT

A system for measurement of three-dimensional motion of an object is provided. The system includes a light projection means adapted for projecting, for distinct time intervals, light of at least two different colors with a cross-sectional pattern of fringe lines onto a surface of the object and also includes image acquisition means for capturing an image of the object during an exposure time, wherein the distinct time intervals are within the duration of the exposure time. The system further includes image processing means adapted for processing the image to obtain a different depth map for each color based on a projected pattern of fringe lines on the object as viewed from the position of the image acquisition means, to determine corresponding points on the depth maps of each color, and to determine a three-dimensional motion characteristic of the object based on the positions of corresponding points on the depth maps.

15 Claims, 6 Drawing Sheets

II-II

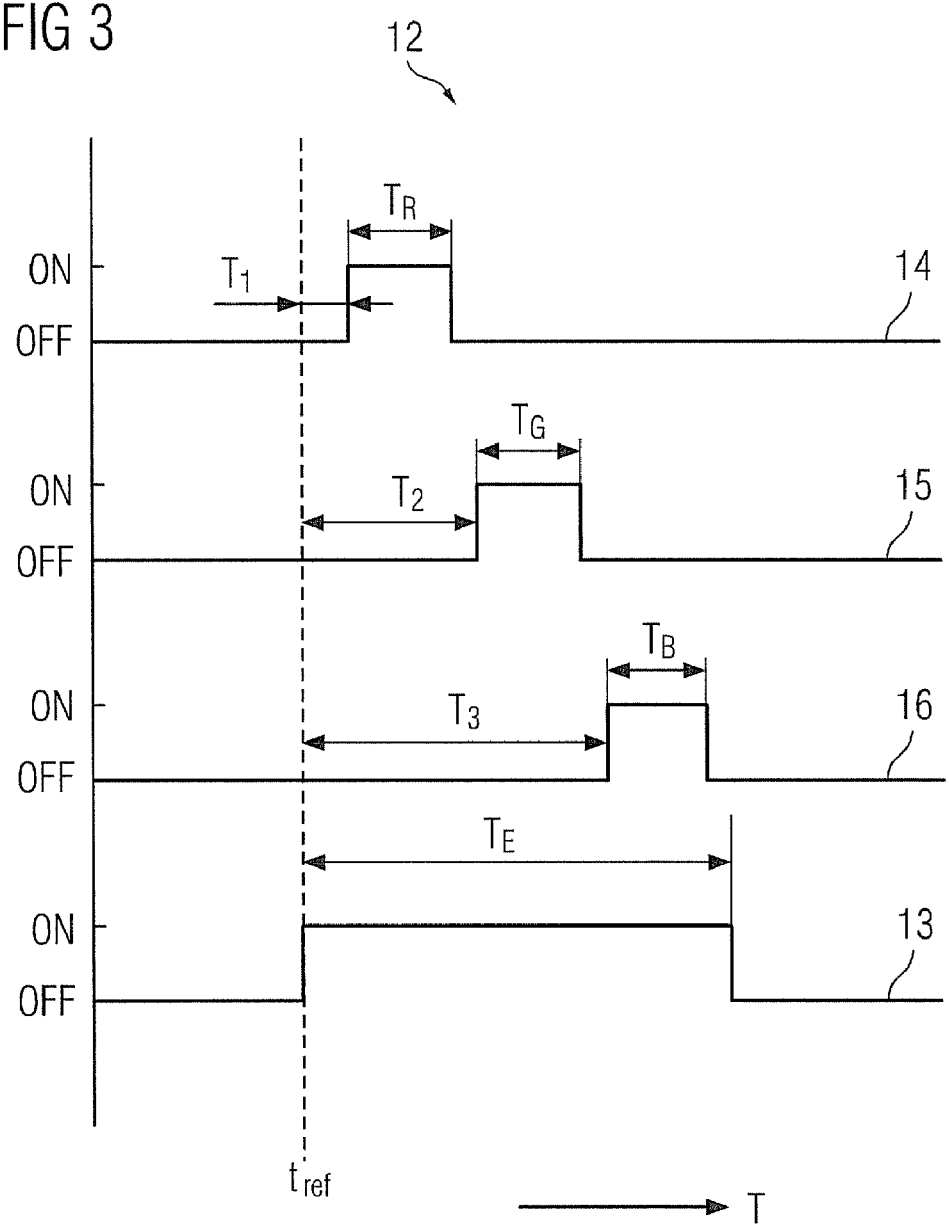

22a

22b

22c

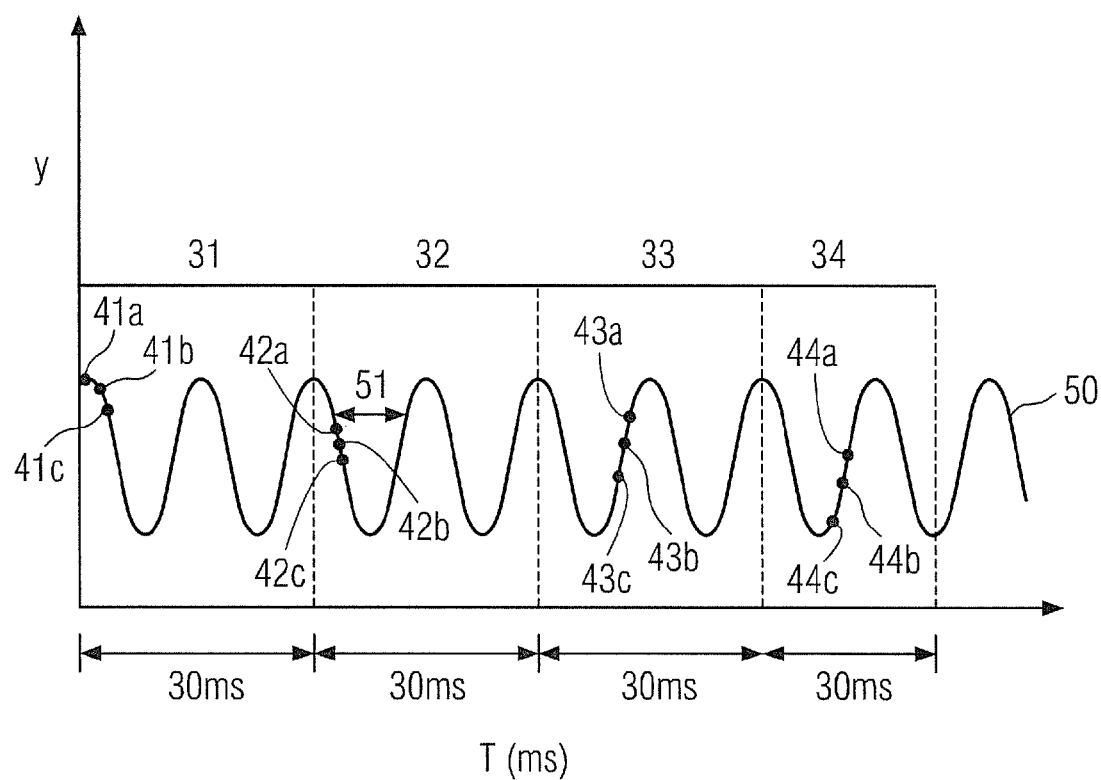

MEASUREMENT OF THREE-DIMENSIONAL MOTION CHARACTERISTICS

CROSS REFERENCE TO RELATED APPLICATIONS

This application claims priority of European Patent Office application No. 10003832.2 EP filed Apr. 9, 2010, which is incorporated by reference herein in its entirety.

FIELD OF INVENTION

The present invention relates to characterization of three-dimensional motion of an object.

BACKGROUND OF INVENTION

Dynamic measurement of motion of a moving object, for example, a vibrating object, is conventionally done using camera based systems that capture successive images of the moving object at successive intervals of time, whereby a motion characteristic is determined based on the position of the object in successively captured image frames. Other known techniques for measurement of vibration motion include the use of strain gages and laser Doppler based methods. However, such techniques are typically suitable for measuring two-dimensional motion and hence cannot be conveniently used for measuring three-dimensional motion such as spatial modes of vibration, which are important for damage and impact analysis of machine parts and civil structures.

In particular, camera based systems capture displacement of various points on a surface of a moving object over time. However, these systems are limited by the frame rate of the camera used, which is a function of the time interval between the capture of two successive image frames. The cost of cameras increases as the frame rates increases, thereby inducing a practical limit on the frame rate. This poses a difficulty in capturing high speed motion by such systems as they have a maximum and minimum limitation of speed for a moving object.

SUMMARY OF INVENTION

The object of the present invention is to provide a system and method for measurement of three-dimensional motion which can be advantageously used for measuring motion at higher speeds for a given image frame rate.

The above object is achieved by the system according to the claims and the method according to claims.

The underlying idea of the present invention is to measure three-dimensional motion at increased speeds for a given frame rate of the image acquisition means (for example, a camera). This is done by projecting light of multiple different colours on a surface of the object, each colour of light being projected for a distinct time interval, which lies within the duration of the exposure time of image capture by the image acquisition means. In this way, in a single image frame, it is possible to capture the motion of the object based on the distinct images corresponding to each of the colours. Thus, based on the number of colours of light projected for distinct time intervals within the duration of the image exposure time, the frame rate of the camera is effectively multiplied. Further, the projected light is configured to have a cross-sectional pattern of fringe lines incident on the surface of the object. Based on the projected fringe lines on the object as viewed from the position of the image acquisition means, a three-dimensional depth map is obtained for each colour. For a given image frame, multiple depth maps are thus obtained, based on the number of colours of light projected at for distinct time intervals within the duration of the image exposure time. A correspondence is established between points on the depth maps of each colour. Finally, three-dimensional motion is measured based on the positions of corresponding points on these depth maps.

In one embodiment, said light projection means comprises at least two light sources of different colours selected from red, green and blue, said light projection means further including means for strobing said light sources for said distinct time intervals. Using light of two or more primary colours such as red, green and blue results in formation of distinct colour planes in the image, which is exposed in the entire duration of said distinct intervals of strobing. This helps in accurately capturing the motion of the object during the exposure time.

In an exemplary embodiment, said cross-sectional pattern includes a succession of parallel fringe lines and said light projection means comprises a grating to configure the profile of the projected light to have said cross-sectional pattern. This provides a structured pattern of projected lines on the object, which deform in a structured manner with movement of the object.

In one embodiment, said image processing means is adapted for determining said three-dimensional motion characteristic based on a difference in coordinates of corresponding points on said depth maps.

In an advantageous embodiment, said three-dimensional motion includes a three-dimensional vibration motion, and wherein said image processing means is adapted for determining a vibration characteristic as said motion characteristic. Measurement of three-dimensional vibration is essential for estimating the life and health of complex structures or machine parts for performance analysis as well as damage and impact analysis.

In an exemplary embodiment, said image processing means is adapted to determine a vibration characteristic that includes a frequency of vibration.

In one embodiment, said image processing means is adapted to determine said vibration characteristic using a time wrapping algorithm.

In an exemplary embodiment, to accurately resolve the problem of correspondence, said image processing means is adapted to determine corresponding points on the depth maps using a template matching algorithm.

BRIEF DESCRIPTION OF THE DRAWINGS

The present invention is further described hereinafter with reference to illustrated embodiments shown in the accompanying drawings, in which:

FIG. 3 is a timing diagram showing the relationship between the image exposure time and the distinct intervals of projection of light of different colours, FIG. 5 illustrates an exemplary depiction of a sample collection phase of images according to an embodiment herein.

DETAILED DESCRIPTION OF INVENTION

Embodiments of the present invention described in detail herein provide a system and method for measurement of three-dimensional (3D) motion of an object that may be used for higher speed motion measurements using image acquisition means, such as a camera, having relatively lower frame rates. To that end, high speed images of an object are acquired by projecting light of multiple different colours for distinct time intervals on the object and capturing an image of the object with an exposure time, such that the duration of the exposure time is inclusive of the distinct time intervals of projection light of different colours. The above technique is referred to herein as colour plane slicing. Using this technique of colour plane slicing, it is possible for low frame rate (hence, low cost) colour camera to get multiple images of respective colours at very small intervals superimposed on a single image captured during the exposure time. Further, to measure motion in 3D, the 3D shape of the object is first determined and the colour plane slicing technique is used in tandem to determine the three-dimensional variation of the position of the object in time.

Figure 1:
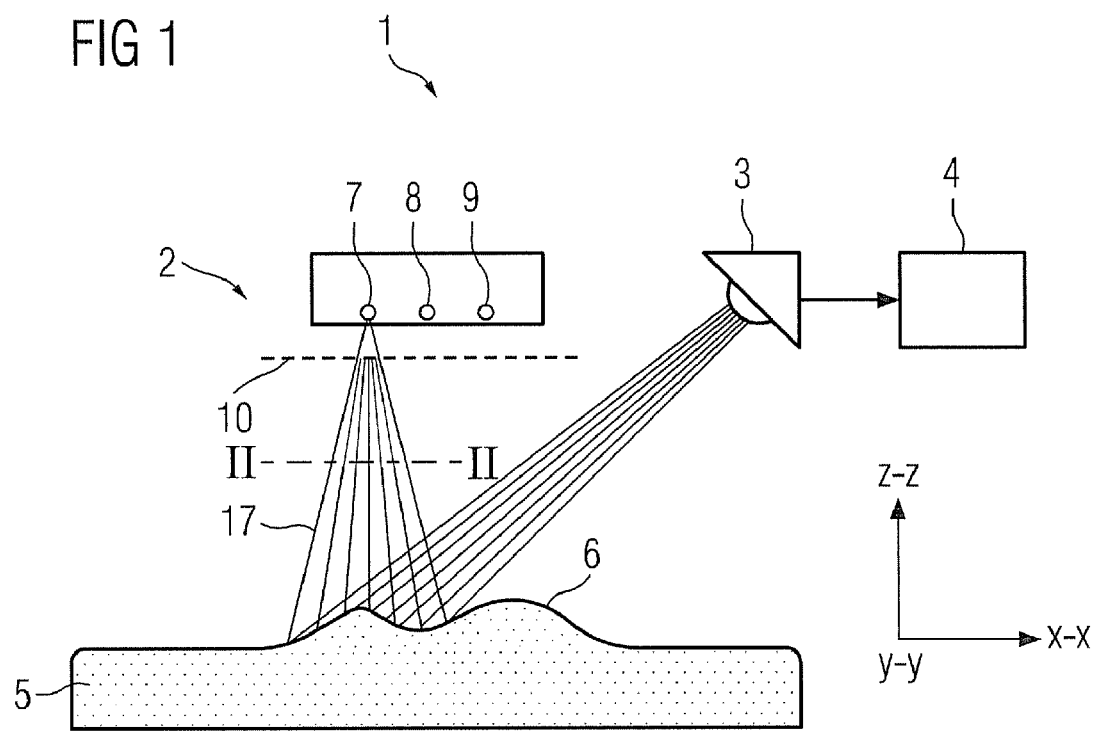
FIG. 1 is a schematic diagram of a system for measurement of three-dimensional motion of an object according to one embodiment of the present invention.

Referring to FIG. 1 is illustrated a system 1 for measurement of 3D motion of an object 5. The system 1 includes light projection means 2, adapted, as mentioned before, for projecting light of different colours for distinct time intervals on the object 5. By "distinct time intervals", it may be understood that the time intervals for projection of various colours do not have any overlap among them. The colours used preferably include colours that are distinct with respect to each other, i.e., colours that do not have one or more components that are common to each other. In this example, light of three primary colours, namely, red, green and blue are used in the light projection means 2. The light projection means 2 may include separate light sources of different colours, or a single light source, for example a white light source, with appropriate colour filters. In the illustrated embodiment, the light projection means 2 includes three light sources, namely a red light source 7, a green light source 8 and a blue light source 9. Each light source may include, for example, LEDs, laser, or any other type of light source, which, in turn, may be a point light source or an area light source.

For even higher speed motion, more than three distinct colours of light may be projected on the object for distinct time intervals, including for example, red, green, blue and ultraviolet light. The technical advantage of the present invention is hence realized by projecting light of at least two distinct colours.

Figure 2:
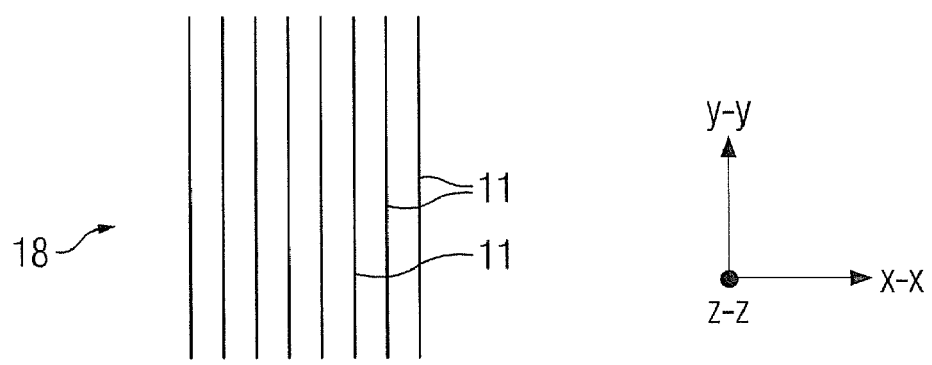
FIG. 2 is a schematic illustration of the cross-sectional pattern of the projected light.

The light beam 17 projected on the object has a cross-sectional pattern of fringe lines. FIG. 2 shows an exemplary cross-section of the light beam 17 projected on the object 5 across a section II-II of the light beam 17 where the light beam 17 has a cross-sectional pattern 18 of a succession of parallel fringe lines 11. This is achieved by providing grating 10 that configures the beam profile to the aforementioned cross-sectional pattern 18. The grating 10 may include, for example, a plurality of parallel longitudinal slits, which in the illustrated embodiment, are along the direction Y-Y. Alternately, the light beam 17 may have any other structured cross-sectional pattern of fringe lines, which may also include patterns of curved lines. Referring back to FIG. 1, the light sources 7, 8, and 9 can thus be point sources. The lines 11 of the projected light 17 are incident on discrete strips on a surface of the object 5, which, in the illustrated example, is an irregular or three-dimensional surface. Image acquisition means 3, which, in this example, is a colour camera 3, captures an image of the projected lines on the surface 5. The camera 3 captures the image from a triangulated position with respect to the positions of the light projection means 2 and the object 5. In other words, the camera 3 is positioned such that the light projection means 2, the object 5 and the camera 3 are not along a straight line. Hence, for any strip on the surface 6, the shape projected line on the strip as viewed by the camera 3 will not remain constant in time but will distinctly deform during the motion of the object 5 in along any of the directions X-X, Y-Y and Z-Z. The deformation of the projected lines on the surface 6 of the object 5 as captured by the camera 3 during the different strobe intervals form the basis of obtaining depth maps at these time intervals which are in turn used as the basis for measuring 3D motion of the object 5.

The camera 3 captures the image with an exposure time during which the light sources 7, 8 and 9 are strobed at distinct time intervals to successively project red, green and blue light on the object. The relationships between the time intervals for strobing the red, green and blue lights and the exposure time are illustrated with an exemplary timing diagram 12 shown in FIG. 3. Herein, the trace 13 represents the ON and OFF times of camera exposure and the traces 14, 15 and 16 represent the ON and OFF times of the red, green and blue strobes respectively. The exposure time, represented by an ON time of the camera exposure, starts at a point in time referred to as $t_{ref}$ and extends for a duration $T_E$. The red, green and blue lights are strobed with respective delays of $T_1$, $T_2$ and $T_3$ from the point in time $t_{ref}$. The time intervals of ON times of the red, green and blue strobes are respectively $T_R$, $T_G$ and $T_B$. As can be seen, the time intervals of the ON times $T_R$, $T_G$ and $T_B$ are distinct, i.e., do not have any overlap among them, and are within the duration of the exposure time $T_E$. The strobing intervals $T_R$, $T_G$ and $T_B$ can be controlled and adapted based on the speed of the object whose motion is being measured.

Figure 4A:
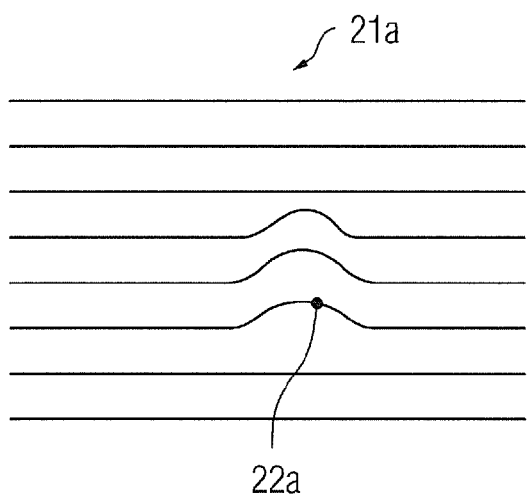
FIGS. 4A, 4B and 4C are exemplary representations of projection lines captured by the camera for different colour of light.
Figure 4B:
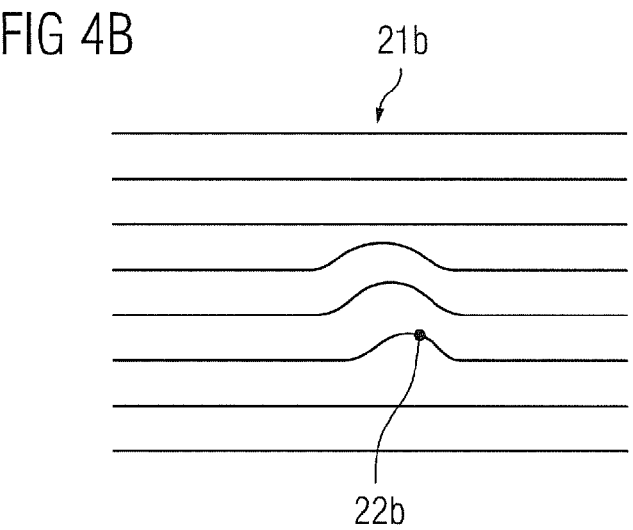
Figure 4C:
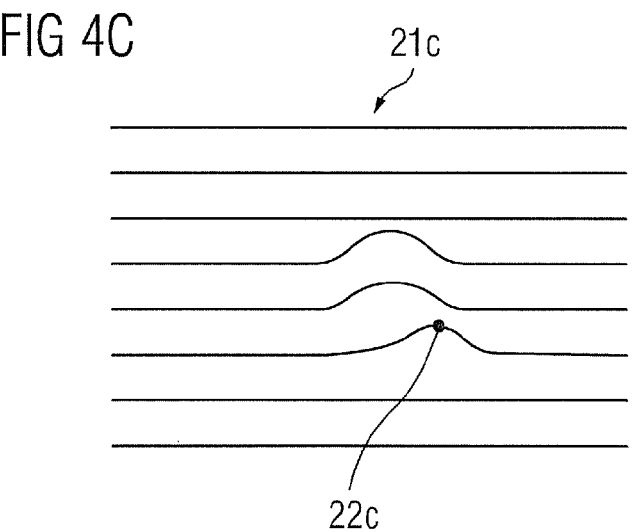

In the scenario shown in FIG. 1, the red light source 7 is being strobed. A small time interval apart, the green light source 8 is strobed and subsequently the blue light source 9 is strobed. FIGS. 4A, 4B and 4C illustrate the projected pattern of fringe lines 21a, 21b and 21c on the object 5 as viewed from the position of the camera 3 and captured by the camera 3 during the strobing intervals of red, green and blue light sources respectively. Due to the motion of the object during the exposure time, the projected fringe lines progressively deform from one strobing interval to the next. For example, a point in a position 22a captured during the red light strobe is seen to move a position 22b during the green strobe and to a position 22c during the blue strobe.

Referring back to FIG. 1, the camera 3 is exposed for the entire duration of the three strobes to acquire projected lines of all the colours on to a single image. The image captured by the camera 3 thus comprises projected fringe lines in three distinct colour planes. The image captured by the camera 3 is processed by image processing means 4, including for example a processor and a memory. Based on the projected lines in the captured image, the image processing means 4 obtains a three-dimensional depth map of the object for each colour. A depth map includes a graphical or tabular plot of points on the surface of the object versus their positions in terms of three-dimensional coordinates. Based on the depth maps of each colour, the image processing means 4 calculates the depth variation of the object between the three colour planes on the basis of which, the motion of the object may be measured in spatially in 3D. To that end, the image processing means 4 may be adapted for executing one or more computer based algorithms as discussed below.

In particular, the depth maps of the three colours are analyzed by the image processing means 4 to find corresponding points between them, for example, using a template matching algorithm. An exemplary template matching algorithm that may be used herein is an iterative closest point (ICP) algorithm. The problem of correspondence of points is important since it dictates which point in a particular colour plane (say red) is moved to where in the temporally subsequent colour planes (green and blue). The image processing means 4 then determines a 3D motion characteristic based on the positions of corresponding points in the depth maps. For example, based on the difference in coordinates of a pair of corresponding points for two temporally consecutive colour planes, an instantaneous velocity of the object may be determined. Further based on a difference in instantaneous velocities determined for two temporally consecutive pairs of colour planes, an instantaneous acceleration of the object may be determined.

An exemplary embodiment of the present invention also illustrates an adaptation of such a system to studying three-dimensional vibration of an object. As mentioned above, one conventional image frame comprises three colour planes, each color plane being acquired at small intervals apart. However, since sampling rates after the three colour planes are limited by the camera image acquisition interval, the vibration motion cannot be precisely captured in between this interval. However, since most physical systems vibrate periodically it may not be necessary capture many samples in one image acquisition interval cycle itself.

In the illustrated example, the strobing interval for each colour is taken to be 0.001 ms and the image acquisition interval of the camera is assumed to be 30 ms. The image acquisition interval of the camera is the reciprocal of image frame rate of the camera. According to proposed technique, samples of the positions of a point are cyclically collected frame by frame with a period of 30 ms; i.e., at 0.001 ms, 0.002 ms, 0.003 ms in the first cycle or frame, at 30*1 ms+0.001 ms, 30*1 ms+0.002 ms, 30*1 ms+0.003 ms in the second cycle or frame, at 30*2 ms+2+0.001 ms, 30*2 ms+2+0.002 ms, 30*2 ms+2+0.003 ms at the third cycle or frame and so on. In this way, it is ensured that adequate samples at different parts of the image acquisition interval are collected.

The sample collection is illustrated in FIG. 5, wherein the displacement Y of the object or a point in the object is plotted against time T (ms). The proposed lighting system allows collection of 3 samples at arbitrarily small intervals. For every 30 ms cycle 31, 32, 33, 34, three samples are collected as represented by points 41*a-c*, 42*a-c*, 43*a-c* and 44*a-c* having coordinates (t1, y1), (t2, y2), (t3, y3), cycle 32 gives sample points (t4, y4), (t5, y5), (t6, y6), and so on etc. The point ($t_n$, $y_n$) represents the time of acquisition of the sample, and the position of a point at that particular time of acquisition. The positions are determined, based on correspondence of points on the depth maps, for example, using template matching. It is further assumed that the vibrating phenomenon does not change in the camera image acquisition interval, which forms the basis of the sampling and analysis.

Figure 6A:
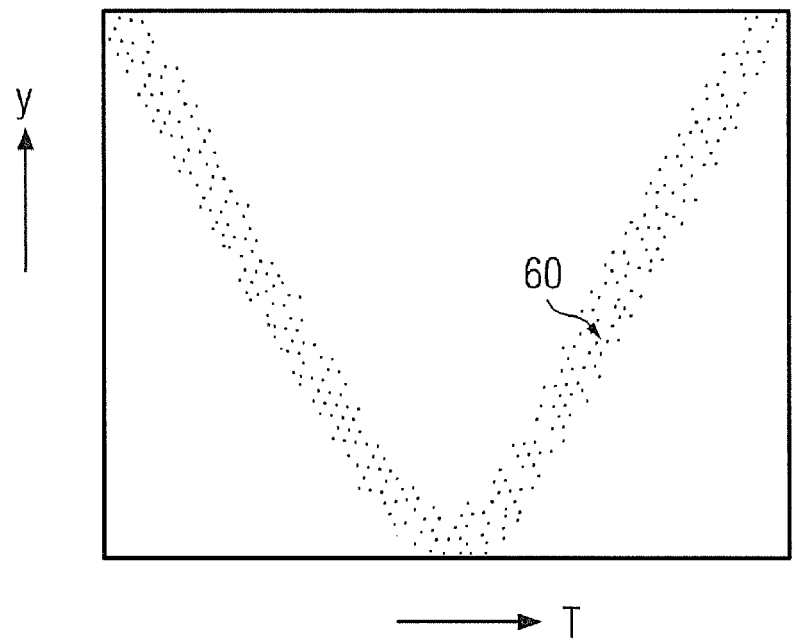
FIG. 6A illustrates an exemplary depiction of clustered data samples at correct wrapping time.
Figure 6B:
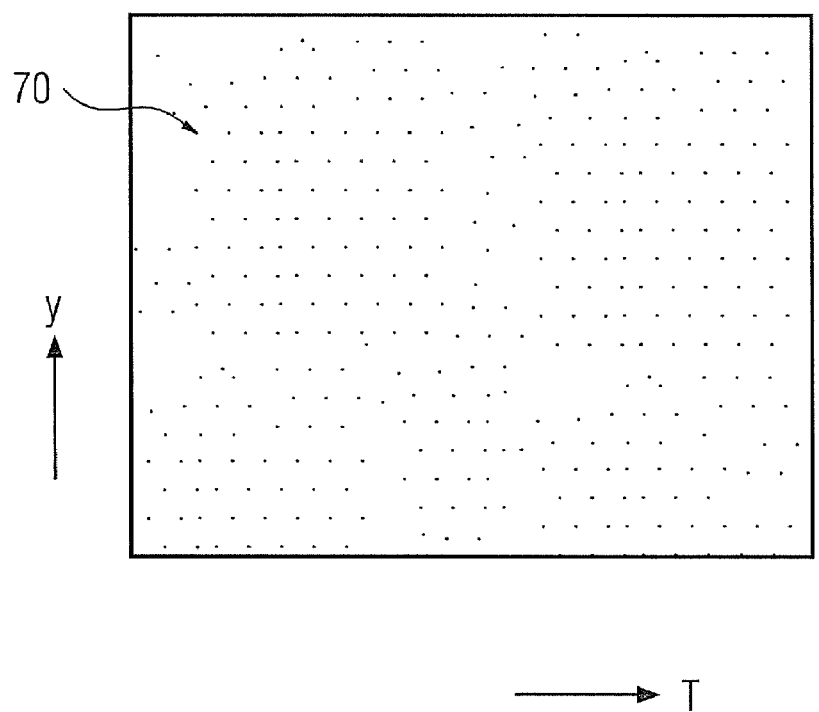
FIG. 6B illustrates an exemplary depiction of scattered data samples at incorrect wrapping time.

Determination of a vibration characteristic involves determining a curve 50 that best describes the vibration motion of the object. In particular, the illustrated embodiment uses a time wrapping algorithm to determine a dominant cycle 51. The time wrapping algorithm starts with an initial guess of the period $T_w$ of the dominant cycle. Subsequently, the data samples are wrapped into assumed period $T_w$. For example, if the initial guess for the period $T_w$=10, then the samples at (2.1, 3.2), (3.2, 0.123), (4.5, 0.34), (12.5, 0.91) (22.4, 0.21), (25.1, −2.3) will be wrapped as (2.1, 3.2), (3.2, 0.123), (4.5, 0.34), (2.5, 0.91), 22.4, 0.21), (5.1, −2.3). If the wrapping time matches with the time period $T_w$, the sample data points will be clustered illustrated by the data points 60 in FIG. 6A. If the wrapping time does not with the time period $T_w$, the sample data points will be sparse as illustrated by the data points 70 in FIG. 6B. In the exemplary embodiment, an error metric is in this case determined as the root means square value of the pair-wise distance between five consecutive points. The time period $T_w$ is then iteratively scanned and value of Tw corresponding to the least value of the error metric is determined as the dominant cycle. The frequency of vibration is determined as a reciprocal of the determined dominant cycle.

Figure 7:
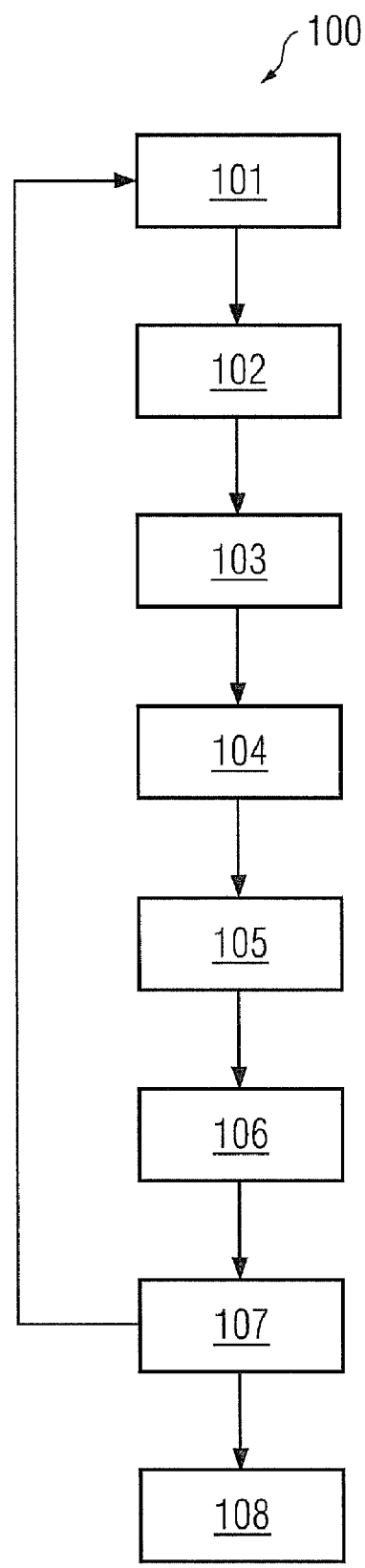
FIG. 7 is an exemplary flowchart illustrating a method for computing frequency of three dimensional vibration motion of an object.

FIG. 7 is an exemplary flowchart summarizing a method 100 for measuring a 3D vibration characteristic of an object according an embodiment of the present invention. The method 100 involves action blocks 101-109 which are discussed below. Block 101 involves beginning of camera exposure. Block 102 involves strobing red light projected on the object for a first distinct time interval. Block 103 involves strobing green light projected on the object for a second distinct time interval. Block 103 involves strobing blue light projected on the object for a third distinct time interval. As discussed above, the cross-sectional pattern of the projected light comprises a succession of parallel lines such that the projected light is incident on discrete strips of the surface of the object. Block 105 involves stopping the camera exposure. Block 106 involves capturing the image comprising projected lines of three different colours. Block 107 involves obtaining depth maps for each colour based on the captured projected lines for that colour, and determining corresponding points on the depth maps. The positions of the determined corresponding points are stored. An inter-frame delay corresponding to the image acquisition time occurs followed by the next acquisition cycle, wherein the control returns to block 101. After a sufficient number of images have been taken, the control proceeds to block 108, which involves determining a vibration characteristic, for example, using a time wrapping algorithm as discussed above.

Embodiments of the present invention offer several advantages in addition to those mentioned above. For example, the present invention provides large range of velocity and acceleration measurements at very high accuracies than even many expensive high speed cameras. Further, the cost of the system is minimal, i.e., the proposed temporal color plane slicing lighting apparatus only needs to replace the existing lighting system used with color cameras. This combination can be directly used in a factory without additional components or fabrication. The present invention may find several applications including, for example, prediction of loading and dynamic stresses and strains on mechanical parts such as crank shafts and shock absorbers to determine failure, evaluation of large civil structures, evaluation of vibrating membranes, and vibration mode shape analysis of objects.

While this invention has been described in detail with reference to certain preferred embodiments, it should be appreciated that the present invention is not limited to those precise embodiments. Rather, in view of the present disclosure which describes the current best mode for practicing the invention, many modifications and variations would present themselves, to those of skill in the art without departing from the scope and spirit of this invention. The scope of the invention is, therefore, indicated by the following claims rather than by the foregoing description. All changes, modifications, and variations coming within the meaning and range of equivalency of the claims are to be considered within their scope.

The invention claimed is:

1. A system for measurement of three-dimensional motion of an object, comprising:
   a light projection means configured to project, for a plurality of distinct time intervals, light of at least two different colors with a cross-sectional pattern of fringe lines on to a surface of the object;
   an image acquisition means for capturing an image of the object during an exposure time, wherein the plurality of distinct time intervals are within a duration of the exposure time; and
   an image processing means configured to process the image to obtain a different depth map for each color based on a projected pattern of fringe lines on the object as viewed from a position of the image acquisition means, to determine corresponding points on the depth maps of each color, and to determine a three-dimensional motion characteristic of the object based on the positions of corresponding points on the depth maps.

2. The system according to claim 1,
   wherein the light projection means includes at least two light sources of different colors selected from red, green and blue, and
   wherein the light projection means further includes a means for strobing the light sources for the plurality of distinct time intervals.

3. The system according to claim 1,
   wherein the cross-sectional pattern includes a succession of parallel fringe lines, and
   wherein the light projection means includes a grating to configure a profile of the projected light to have the cross-sectional pattern.

4. The system according to claim 1, wherein the image processing means is configured to determine the three-dimensional motion characteristic based on a difference in coordinates of corresponding points on the depth maps.

5. The system according to claim 1,
   wherein the three-dimensional motion includes a three-dimensional vibration motion, and
   wherein the image processing means is configured to determine a vibration characteristic as the three-dimensional motion characteristic.

6. The system according to claim 5, wherein the image processing means is configured to determine a vibration characteristic that includes a frequency of vibration.

7. The system according to claim 6, wherein the image processing means is configured to determine the vibration characteristic using a time wrapping algorithm.

8. The system according to claim 1, wherein the image processing means is configured to determine corresponding points on the depth maps using a template matching algorithm.

9. A method for measurement of three-dimensional motion of an object, comprising:
   projecting, for a plurality of distinct time intervals, light of at least two different colors with a cross-sectional pattern of fringe lines on to a surface of the object;
   capturing an image of the object during an exposure time, wherein the plurality of distinct time intervals are within a duration of the exposure time; and
   processing the image to obtain a different depth map for each color based on a projected pattern of fringe lines on the object as viewed from a position capturing of the image, to determine corresponding points on the depth maps of each color, and to determine a three-dimensional motion characteristic of the object based on the positions of corresponding points on the depth maps.

10. The method according to claim 9, further comprising determining the three-dimensional motion characteristic based on a difference in coordinates of corresponding points on the depth maps.

11. The method according to claim 9,
    wherein the three-dimensional motion includes a three-dimensional vibration motion, and
    wherein determining the motion characteristic includes determining a vibration characteristic.

12. The method according to claim 11, wherein the determination of the vibration characteristic includes computing a frequency of vibration.

13. The method according to claim 11, further comprising using a time wrapping algorithm to determine the vibration characteristic.

14. The method according to claim 9, wherein corresponding points on the depth maps are determined using a template matching algorithm.

15. The method according to claim 9, wherein the projecting further comprises strobing at least two light sources of different colors selected from red, green and blue for the plurality of distinct time intervals.

* * * * *